UNITED STATES PATENT OFFICE.

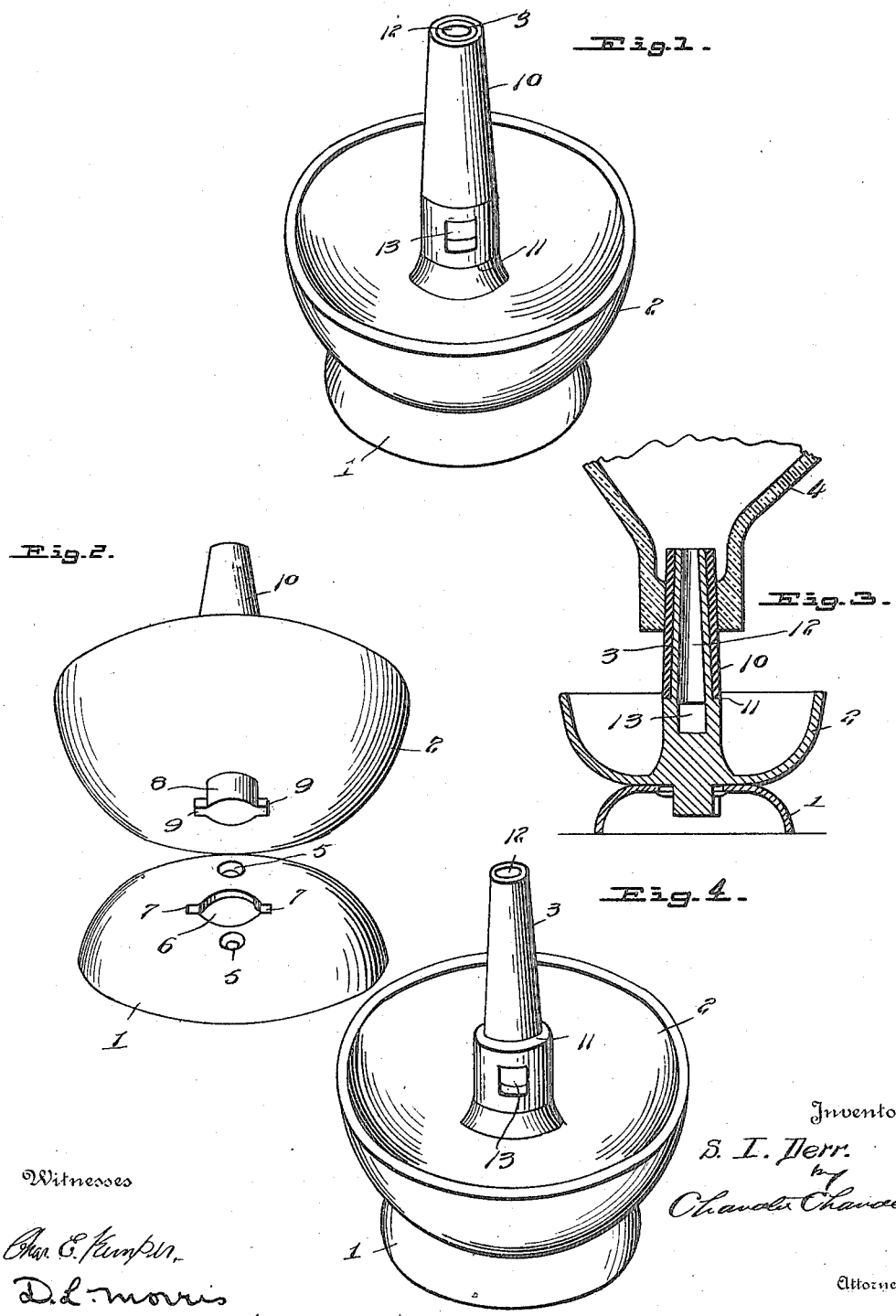

SAMUEL I. DERR, OF EMAUS, PENNSYLVANIA.

POULTRY DRINKING-FOUNTAIN.

1,180,285.  Specification of Letters Patent.  Patented Apr. 25, 1916.

Application filed March 11, 1914. Serial No. 824,019.

*To all whom it may concern:*

Be it known that I, SAMUEL I. DERR, a citizen of the United States, residing at Emaus, in the county of Lehigh, State of Pennsylvania, have invented certain new and useful Improvements in Poultry Drinking-Fountains; and I do hereby declare the following to be a full, clear, and exact description of the invention, such as will enable others skilled in the art to which it appertains to make and use the same.

This invention relates to poultry drinking fountains.

An object of the invention is to provide a fountain which is capable of maintaining a constant supply of water as the poultry drink therefrom and will also maintain the same in a sanitary condition.

A further object is the provision of a fountain made of several detachable parts so that the same may be readily disassembled and thoroughly cleaned.

With the above and other objects in view my invention consists in the combination and arrangement of parts as herein set forth and subsequently claimed.

Referring to the drawing wherein like parts are designated by like reference characters throughout the several views; Figure 1 is a perspective view of the preferred embodiment of my invention. Fig. 2 is a view showing the means for detachably securing the base to the water receptacle. Fig. 3 is a vertical section with a supply bottle thereon. Fig. 4 is a perspective view of a modification of my invention.

Referring to the drawing the device comprises a base 1 to which is detachably secured a water receptacle 2. Integrally formed within the receptacle and vertically extending therefrom is a hollow shank member 3 on which is supported a supply bottle 4. The base member 1 is adapted to be secured to a suitable stationary member by screws passing through the apertures 5—5. In the upper surface of the base 1 is formed an opening 6 having extending therefrom radial slots 7. On the under side of the receptacle 2 is formed a lug 8 having projections 9 formed thereon. The shank member 3 is tapered from bottom to top and has arranged thereon a rubber member 10 which abuts against a shoulder 11. A hole 12 is formed longitudinally within the shank 3 and communicates with a transverse hole 13 which in turn communicates with the receptacle below the upper edge thereof.

In assembling this device the receptacle is inverted and the shank inserted into the mouth of a suitably filled bottle. The receptacle is then turned into an upright position, thus leaving the bottle in inverted position, and the member 8 is inserted into the opening 6 with the projections 9 registering with the slots 7 and the receptacle is given a partial rotation and the device is securely locked in operative position.

The water will flow from the inverted bottle into the receptacle until the apertures 13 are completely submerged and then the flow will automatically stop. Thus it may be seen that, as the water is used from the receptacle by the poultry and the level drops below the apertures 13 the water from the bottle will be automatically fed and insure a constant supply.

By virtue of the tapered construction of the shank 3 various sized bottles may be used and as shown in Fig. 4 the rubber member may be omitted where the diameter of the mouth of the bottle which it is desired to use is less than the diameter of the upper portion of the rubber, thus permitting the use of a smaller bottle than can be used with the rubber in place.

It is desirable to make this device of iron as it is found that the water is kept sweeter in an iron receptacle than in those made of zinc, which latter material is commonly used, as water standing in zinc becomes poisonous after a while.

It may be thus seen that I have provided a fountain in which a constant supply of water will be maintained and this water will be kept in a sanitary condition and that by making the supply shank integral with the water receptacle and the water receptacle itself of iron this result is accomplished.

What is claimed is:

In a drinking fountain, the combination with a concavo-convex receptacle having a downwardly extending lug on the bottom thereof, radial projections formed on the said lug, and a concavo-convex base having a centrally located opening therein and radial slots extending from said opening, the said opening and slots being adapted to receive the aforementioned lug and projection and the base being of less diameter than the said receptacle.

In testimony whereof, I affix my signature, in the presence of two witnesses.

SAMUEL I. DERR.

Witnesses:
 THOS. F. DIEFENDERFER,
 ELLA M. SNYDER.

Copies of this patent may be obtained for five cents each, by addressing the "Commissioner of Patents, Washington, D. C."